F. SCHULZE.
HARVESTING MACHINE.
APPLICATION FILED DEC. 20, 1913.
1,431,330.
Patented Oct. 10, 1922.
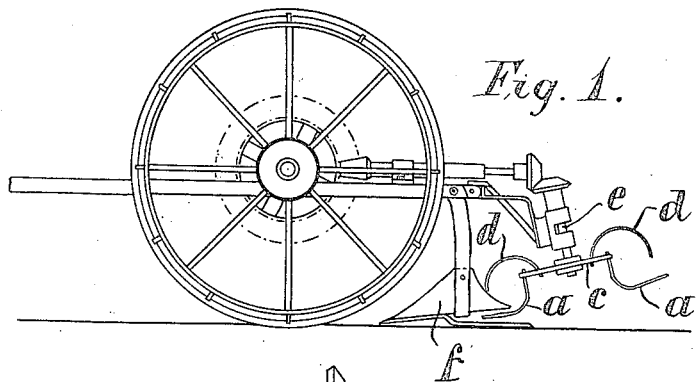
Fig. 1.
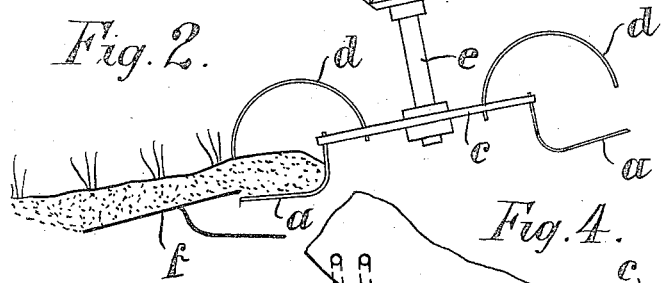
Fig. 2.
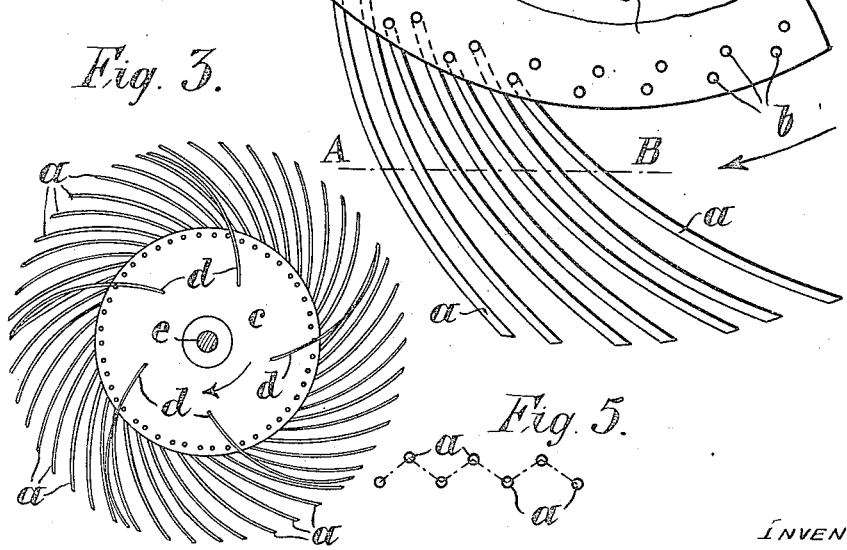
Fig. 3.
Fig. 4.
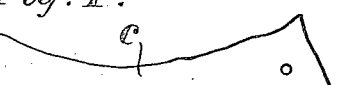
Fig. 5.
INVENTOR
Friedrich Schulze,
by Wm H Babcock & Son
WITNESSES
Chas. L. Griesbauer.
W. H. Gross
ATTORNEYS.

Patented Oct. 10, 1922.

1,431,330

UNITED STATES PATENT OFFICE.

FRIEDRICH SCHULZE, OF OTTERSBECK, GERMANY.

HARVESTING MACHINE.

Application filed December 20, 1913. Serial No. 807,883.

*To all whom it may concern:*

Be it known that I, FRIEDRICH SCHULZE, a subject of the Emperor of Germany, residing at Ottersbeck-Allee 1, Hamburg 19, Germany, have invented certain new and useful Improvements in Harvesting Machines, of which the following is a specification.

This invention relates to harvesting machines for potatoes and the like, and has for its object to provide an improved construction of machine of this character which shall be capable of effectively separating the potatoes or other tubers or bulbs from the surrounding earth and from the plants themselves, the potatoes being left on the surface of the earth for subsequet collection.

The principal feature of the invention consists in the provision of a sieve or grate composed of a number of rods or bars, which are curved in both horizontal and vertical directions and also backward with relation to the direction of rotation, the horizontally curved portions of the bars constituting a receiving and delivering member and the vertically curved portions thereof a gathering or collecting member. A further feature of the invention consists in the provision of additional curved arms or rods for the purpose of removing the stalks and foliage of the plant.

The invention is illustrated in the accompanying drawings, of which Figure 1 is a view in side elevation of a harvesting machine constructed in accordance with the invention, Figure 2 being a similar view of a portion of the machine shown in Figure 1 and illustrating the action of the various elements thereof.

Figure 3 is a plan view of the revolving sieve or grate of the harvesting machine, Figure 4 being a similar view on an enlarged scale but illustrating a modified construction.

Figure 5 is a diagrammatic sectional view on the line A—B of Figure 4 illustrating the arrangement of the curved rods or bars.

Referring now to Figures 1, 2 and 3, the harvesting machine comprises a sieve or grate composed of a number of curved rods or bars $a$, arranged in substantially circular series as shown, one end of each of these rods being secured to a supporting disc $c$.

In a preferred construction the rods $a$ are secured in apertures $b$ formed in the disc $c$, as illustrated in Figure 4.

The upper portions of the rods $a$ adjacent to the disc $c$ are directed substantially vertically downwards, the remaining portions of the rods being bent at right-angles and curved as shown in the plan view of Figure 3 and the lower portions of said rods extending horizontally outward in a horizontal plane and backward with relation to the direction of rotation. Of course the inclined arrangement of the shaft $e$ and disc $c$ hereinafter described presents these lower parts of the rods in a position inclined from the horizontal. The outer ends of the rods $a$ are almost in contact with the underside of a share or earth cutter indicated at $f$ and extend under its upwardly tilted rear end in their nearest position of rotation, so that the rods $a$ constitute a circular sieve or grate member located underneath the disc $c$ and adapted to receive the mass of earth containing the potato plant and separated by means of the share $f$. The disc $c$ and the sieve or grate member connected thereto constituted by the rods $a$, are arranged to be rotated as the machine is drawn along the ground, by means of an inclined shaft $e$ upon which the disc $c$ is mounted and which is connected by bevelled gearing to the wheels of the machine, said inclined shaft and disc being rotated together and having the same inclination and axis. In operation the upper portions of the rods $a$ constitute a gathering or collecting member, and the lower curved portions a receiving and delivering member. The backward direction of the lower parts of the rods enables them to slide easily under the earth and potatoes, in turning, without risk of injury.

Secured to the upper portion of the disk $c$ are a number of curved arms or rods $d$ which serve to remove the stalk and foliage of the plant, the arms $d$ being secured in holes in the disk $c$ in a similar manner to the rods $a$. The additional rods $d$ are curved upwards and over the edge of the disk $c$, so that their free ends only come in contact with the mass of earth removed by the share $f$, and during the rotation of the disk $c$ to remove the upper portion of the plant to one side. It will be understood that if desired the additional rods $d$ can be secured directly to the shaft $e$.

Referring now to the modified construction illustrated in Figures 4 and 5, the rods $a$ constituting the rotating sieve or grate are secured in holes $b$ in the disk $c$ arranged in two concentric circles, the rods *a* being so curved that the surface of the sieve or grate is irregular and corrugated, as shown diagrammatically in Figure 5.

The rotating sieve or grate can be arranged to be driven either directly from the axle of the machine, as illustrated in the drawings, or by means of a special motor provided for the purpose, the latter arrangement being preferable in cases in which the harvesting machine is intended to deal with a double row of plants. The power required to operate the machine is comparatively small, since the potatoes are not required to be projected to any considerable distance, and the sieve or grate can therefore be arranged to rotate slowly.

The improved machine can evidently be employed for harvesting other tuberous or bulbous plants than potatoes, and the invention is not to be regarded as limited to the constructional details above described, which may be modified in order to meet particular conditions without exceeding the scope of the invention.

I claim as my invention:

In combination with an earth cutter, a rotary root-gathering device consisting of a circular series of rods set close together to form a grate, the exterior part of each of said rods being bent downward and also curved backward from the direction of rotation and the said device being set in a slanting position behind the cutter so that the said grate is at a slight angle to the horizontal plane.

In testimony whereof I have hereunto set my hand in presence of two subscribing witnesses.

FRIEDRICH SCHULZE.

Witnesses:
 ERNEST H. L. MUMMENHOFF,
 FRANCIS R. STEWART.

Certificate of Correction.

It is hereby certified that in Letters Patent No. 1,431,330, granted October 10, 1922, upon the application of Friedrich Schulze, of Ottersbeck, Germany, for an improvement in "Harvesting Machines," an error appears in the printed specification requiring correction as follows: In the grant and in the heading to the printed specification the residence of the patentee was erroneously given as "Ottersbeck, Germany," whereas said residence should have been given as *Hamburg, Germany;* and that the said Letters Patent should be read with this correction therein that the same may conform to the record of the case in the Patent Office.

Signed and sealed this 12th day of December, A. D., 1922.

[SEAL.] KARL FENNING,
*Acting Commissioner of Patents.*